(12) United States Patent
Totale et al.

(10) Patent No.: US 9,189,761 B1
(45) Date of Patent: Nov. 17, 2015

(54) ACTION FLOW CLIENT FRAMEWORK

(75) Inventors: Sachin G. Totale, Bangalore (IN); Rajakumar Thiruvasagam, Bangalore (IN); Srinivasa Gururao, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 854 days.

(21) Appl. No.: 13/474,501

(22) Filed: May 17, 2012

(51) Int. Cl.
*G06Q 10/06* (2012.01)
*G06Q 40/02* (2012.01)

(52) U.S. Cl.
CPC ........ *G06Q 10/06311* (2013.01); *G06Q 40/025* (2013.01)

(58) Field of Classification Search
CPC ................................ G06Q 10/10; G06Q 90/00
See application file for complete search history.

(56) References Cited

U.S. PATENT DOCUMENTS

| | | | | |
|---|---|---|---|---|
| 5,181,162 A * | 1/1993 | Smith et al. | | 715/209 |
| 5,734,837 A * | 3/1998 | Flores et al. | | 705/7.13 |
| 6,073,109 A * | 6/2000 | Flores et al. | | 705/7.13 |
| 6,167,564 A * | 12/2000 | Fontana et al. | | 717/104 |
| 6,256,676 B1 * | 7/2001 | Taylor et al. | | 709/246 |
| 6,256,773 B1 * | 7/2001 | Bowman-Amuah | | 717/121 |
| 6,275,977 B1 * | 8/2001 | Nagai et al. | | 717/104 |
| 6,356,903 B1 * | 3/2002 | Baxter et al. | | 707/702 |
| 6,370,544 B1 * | 4/2002 | Krebs et al. | | 1/1 |
| 6,370,681 B1 * | 4/2002 | Dellarocas et al. | | 717/110 |
| 6,421,691 B1 * | 7/2002 | Kajitani | | 715/234 |
| 6,489,980 B1 * | 12/2002 | Scott et al. | | 715/854 |
| 6,601,233 B1 * | 7/2003 | Underwood | | 717/102 |
| 6,938,240 B2 * | 8/2005 | Charisius et al. | | 717/104 |
| 7,035,809 B2 * | 4/2006 | Miller et al. | | 705/7.23 |
| 7,139,999 B2 * | 11/2006 | Bowman-Amuah | | 717/101 |
| 7,155,662 B1 * | 12/2006 | Edwards et al. | | 715/229 |
| 7,292,990 B2 * | 11/2007 | Hughes | | 705/7.14 |
| 7,325,193 B2 * | 1/2008 | Edd et al. | | 715/255 |
| 7,415,484 B1 * | 8/2008 | Tulkoff et al. | | 1/1 |
| 7,668,864 B2 * | 2/2010 | Benson et al. | | 707/608 |
| 7,937,281 B2 * | 5/2011 | Miller et al. | | 705/7.12 |
| 8,069,161 B2 * | 11/2011 | Bugir et al. | | 707/706 |
| 8,140,362 B2 * | 3/2012 | Deshpande et al. | | 705/7.11 |
| 8,230,423 B2 * | 7/2012 | Frigo et al. | | 718/102 |
| 8,335,706 B1 * | 12/2012 | Glass et al. | | 705/7.16 |

(Continued)

OTHER PUBLICATIONS

Donald et al., Spring Web Flow Reference Guide, located at "http://static.springsource.org/spring-webflow/docs/2.3.x/reference/htmlsingle/spring-webflow-reference.html#whatsnew", 2011.

*Primary Examiner* — Jimmy H Tran (74) *Attorney, Agent, or Firm* — Van Pelt, Yi & James LLP (57) ABSTRACT

Interface control(s) associated with declaratively defining an action flow are provided; the action flow includes a desired outcome of an action flow. Information associated with a user interface page is received; this information includes a state during which the user interface page is displayed. Information associated with a business service associated with a content management server is received; that information includes a state during which the business service is performed on the content management server. In the action flow definition, a first association between the user interface page and the state during which the user interface page is displayed and a second association between the business service and the state during which the business service is invoked on the content management server are recorded.

24 Claims, 9 Drawing Sheets

(56) References Cited

U.S. PATENT DOCUMENTS

| | | | |
|---|---|---|---|
| 8,504,405 B2* | 8/2013 | Miller et al. | 705/7.23 |
| 8,548,837 B2* | 10/2013 | Ahern et al. | 705/7.12 |
| 8,645,248 B2* | 2/2014 | Roselli et al. | 705/35 |
| 8,781,882 B1* | 7/2014 | Arboletti et al. | 705/7.39 |
| 8,782,616 B2* | 7/2014 | Wright | 717/136 |
| 8,898,264 B1* | 11/2014 | Walther et al. | 709/223 |
| 2002/0111922 A1* | 8/2002 | Young et al. | 705/80 |
| 2002/0184255 A1* | 12/2002 | Edd et al. | 707/500 |
| 2003/0236689 A1* | 12/2003 | Casati et al. | 705/7 |
| 2004/0068424 A1* | 4/2004 | Lee et al. | 705/7 |
| 2004/0098281 A1* | 5/2004 | Chien et al. | 705/1 |
| 2004/0143597 A1* | 7/2004 | Benson et al. | 707/104.1 |
| 2005/0216507 A1* | 9/2005 | Wright | 707/104.1 |
| 2006/0230408 A1* | 10/2006 | Frigo et al. | 718/108 |
| 2006/0230409 A1* | 10/2006 | Frigo et al. | 718/108 |
| 2006/0235732 A1* | 10/2006 | Miller et al. | 705/7 |
| 2007/0094199 A1* | 4/2007 | Deshpande et al. | 706/47 |
| 2010/0122236 A1* | 5/2010 | Bugir et al. | 717/109 |
| 2011/0295643 A1* | 12/2011 | Miller et al. | 705/7.23 |
| 2012/0095600 A1* | 4/2012 | Wewalaarachchi et al. | 700/275 |
| 2012/0179677 A1* | 7/2012 | Roselli et al. | 707/736 |
| 2012/0215816 A1* | 8/2012 | Kidron | 707/803 |
| 2012/0222133 A1* | 8/2012 | Kidron | 726/28 |
| 2013/0275429 A1* | 10/2013 | York et al. | 707/737 |
| 2013/0339099 A1* | 12/2013 | Aidroos | 705/7.36 |

* cited by examiner

ACTION FLOW CLIENT FRAMEWORK

BACKGROUND OF THE INVENTION

Content management applications, such as EMC Documentum, provide services and processes for managing documents and/or content for large enterprises. Some example services or processes provided by a content management application include "shepherding" content or documents through various stages or steps, for example to collect data, get approval, store information and so on related to a particular line of business. A content management application may ensure (as an example) proper company and/or regulatory procedure has been followed and/or no item is forgotten or left behind at a particular step. In some cases, a content management application provides a generalized, out-of-the-box platform or framework for creating, managing, and storing content, and the out-of-the-box platform is customized for a customer's specific needs. For example, a pharmaceutical company may customize a content management application for their particular needs related to product development (e.g., to track the progress of drug development from research and development in the laboratory through clinical drug trials).

It is desirable for such content management applications to have channels by which information can be exchanged with people who are not employees of a company, for example customers of a bank who want to apply for a loan. It is further desirable if content management applications (e.g., EMC Documentum) offered techniques by which their customers (e.g., a bank) could create an action flow (e.g., a web-based loan application) which offers advantages during the design phase (e.g., when a loan application is created or updated) and/or at run time (e.g., when an applicant accesses a loan application).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A variety of techniques associated with action flows is described herein. Some of the techniques described herein are associated with creating or modifying action flow definitions. For example, interface controls associated with declaratively defining an action flow are provided. Declaratively-defined action flows includes a desired outcome of an action flow (e.g., as opposed to imperatively-defined where an algorithm or process is specifically and/or explicitly provided. Via these interface controls, information about the action flow (e.g., to be stored in the action flow definition) is received. For example, a user interface page and an associated state during which the user interface page is displayed is received, and a business service (e.g., stored on a content management server) and an associated state during which the business service is performed on the content management server is received; associations between these things are recorded in an action flow definition. Some of the techniques described here are associated with running or otherwise providing an action flow. For example, a front-end server may provide, to a client device, an action flow definition which includes an association between a user interface page and a state during which the user interface page is displayed, as well as an association between a business service and a state during which the business service is performed on the content management. The action flow definition is agnostic with respect to user interface technology (e.g., on the client device) associated with displaying (e.g., a desired sequence or flow of states is described without describing how that sequence or flow is achieved). The client device which receives the action flow definition is configured to perform the action flow definition, for example by displaying the user interface page at the appropriate state and triggering the business service to be performed on the content management server during the appropriate state. A content management server is configured to perform, in response to the trigger from the client, the business service. Performing at least some of the action flow definition on a client device may be desirable since it may produce as better user experience (e.g., not having to reload an entire page as a result of having to ask a server for instruction) and/or have better performance (e.g., not affected by a slow network connection and/or an overloaded server).

Figure 1:
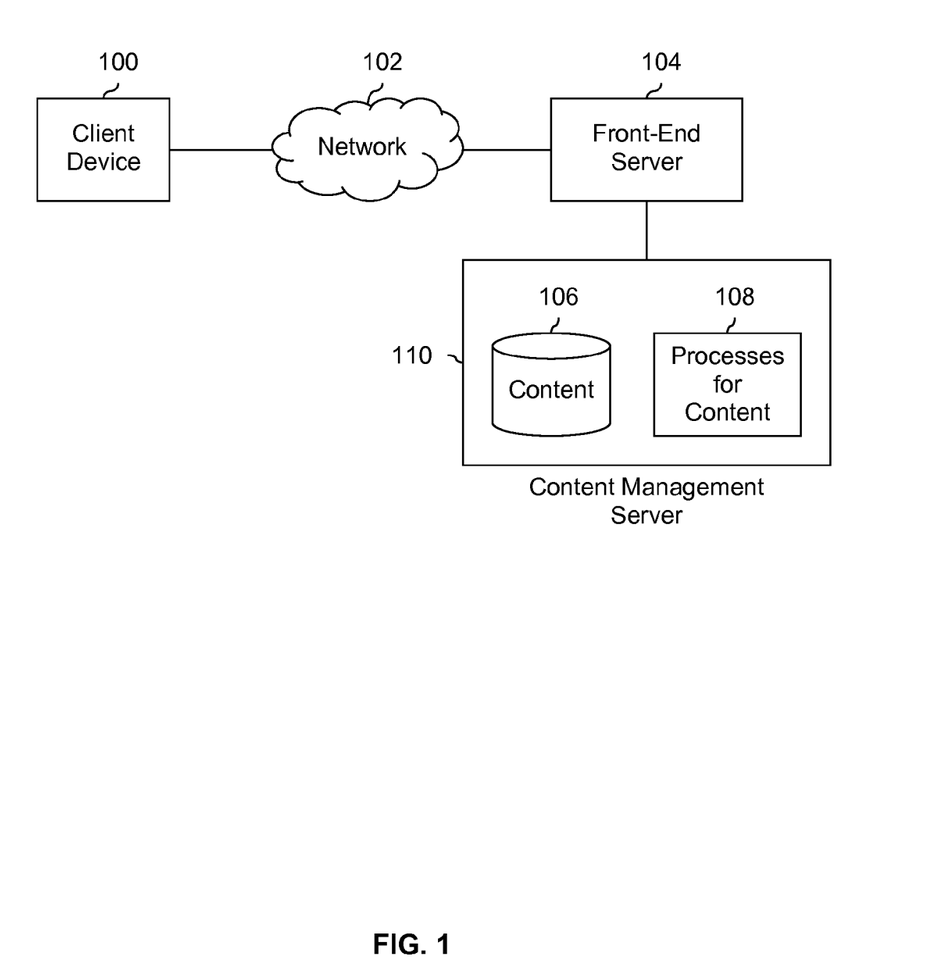
FIG. 1 is a diagram showing an embodiment of an action flow framework system.

FIG. 1 is a diagram showing an embodiment of an action flow framework system. In the example shown, front-end server 104 and content management server 110 are associated with a company, for example a bank. The exemplary bank (or any other type of company) uses a content management application, the related content, documents, and services of which are stored on and/or provided by content management server 110. In one example, content database 106 stores content for the bank, for example documents and/or content related to loan applications, checking and savings accounts held with the bank, and/or investment accounts managed by the bank. Some examples include transactions, statements, and customer information. Services and processes related to creating, managing, and/or accessing the content in content database 106 are stored in and provided by processes for content 108.

In one example, a content management application running on content management server 110 associated with EMC Documentum which has generic, out-of-the-box functionality which is customized and/or supplemented with business-specific business processes and services for creating, managing, storing and/or accessing content or documents. For example, a bank may create processes and services for ensuring that regulatory requirements are complied with (e.g., a process to calculate the amount of FDIC insurance the bank has to pay for checking and savings accounts, a process to ensure proper tracking of cost basis for investment accounts in order to comply with IRS reporting regulations, etc.), as well as business services related to company-specific policies (e.g., a business service that ensures that a credit check is done on all loan applicants, a business service that automatically approves or declines loan applications based on specified income criteria and specified credit scores, etc.). The same content management application (e.g., EMC Documentum) with its generic, out-of-the-box processes and services may also be used by and customized for a pharmaceutical company to manage and track documents and document content related to product development (e.g., storing, managing, and tracking content related to the various stages of drug trials and FDA approval).

Client device 100 exchanges information with content management server 110 via network 102 and front-end server 104. Some examples of client device 100 include mobile telephones, computers (including laptops and desktop computers), tablets, and e-readers. A customer of a bank may use client device 100 to access content stored in and/or provide new content for content management server 110. For example, via a web-interface, a customer of a bank may use client device 100 to create a new loan application or update a saved application. A loan applicant may use client device 100 to provide the content of a loan application (e.g., the name of loan applicant, the applicant's address, etc.) which is then transferred to and stored in content database 106 in content management server 110.

Loan applications and other user interfaces are referred to more generally as action flows. Processes and services associated with creating, accessing, and/or managing action flows are stored on and provided by front-end server 104. Action flows include user interface pages, transitions between user interface pages, and business services to be performed at various points in the action flow. A bank employee (to continue the example above) may access front-end server 104 in order to declaratively define the components of an action flow (e.g., a user interface page, a transition, etc.) and the relationships between them. In some embodiments, the components (such as a user interface page or a business service) are already created and front-end server 104 is directed to the already-created component by a user (e.g., a bank employee tasked with creating a loan application). In some embodiments, front-end server 104 includes a process or service by which a component is created or synthesized (e.g., from scratch).

Once an action flow is defined, information associated the action flow is stored on front-end server 104 as an action flow definition. An action flow definition stored on front-end server 104 describes, for example, what user interface pages, transitions, and business services are included in an action flow and how they are connected, so that an entity (e.g., client device 100) knows how to properly provide or otherwise execute the action flow. A stored action flow definition may later be updated using front-end server 104.

In this example, an action flow definition is at least partially executed on client device 100, for example when a loan applicant is applying for a loan, the action flow definition associated with the loan application is executed at least in part by client device 100. Front-end server 104 may transfer to client device 100 processes, logic and/or executables to be performed by or on client device 100 which describe the action flow. This enables client device 100 to know how to respond to user interaction with the action flow without, for example, having to contact front-end server 104 for instruction or guidance. This may include running (on client device 100) local processes (e.g., data transformations, error checking, etc.) on data entered by a user without, for example, uploading the data to front-end server 104 for processing and having the front-end server return the process results, if any. Client device 100 would also know, for example, the transitions between user interface pages, and thus what user interface page to display next based on (for example) the current user interface page and input from the user. Similarly, this is done by client device 100 without consulting front-end server 104 as to what user interface page should be displayed next given the current state and input.

The system described herein has a number of advantages, some of which are related to creation and/or update of action flows. To continue the loan application example, the system provides processes and services (tools) via which a bank employee can declaratively define components of the action flow. As used herein, a declaratively-defined action flow includes a desired outcome of an action flow but does not (for example) include an executable step associated with achieving the desired outcome. A desired progression or sequence of states and/or actions in an action flow may be defined without limiting it or tying it to a specific underlying set of instructions, or being hard coded to a specific programming language or technology. Put another way, a declaratively-defined action flow describes what happens, but not necessarily how it happens. This permits non-technical users with industry-specific or company-specific expertise to construct an action flow without requiring extensive technical knowledge. Another advantage to the system is that update of and/or modification to an existing action flow is made easier. Some other systems have actions flows that are "hard coded" or tightly coupled to a specific implementation, making updates and modifications difficult. The system described herein permits declarative definitions, which are much more easily modified, for example if a new business service is created and needs inserted into the action flow.

Some other benefits of the system are related to or are observable at run or execution time (e.g., when an applicant accesses and fills out a loan application). Execution is performed at least in part on client device 100, which may offer better performance and/or an improved user experience than other systems which require much more instruction or guidance from a server. For example, since client device 100 does not need to access front-end server 104 for every single thing, the system is not subject to a slow network 102 or an overloaded front-end server 104. In some cases, going to a server for instruction or guidance would require an entire user interface page to be re-loaded, even if only some of the user interface page is affected. Using the techniques described herein, it may not be necessary to re-load the entire page and it may be possible re-draw only that portion of the user interface page which needs to be updated or changed. For example, instead of observing a completely blank or empty page, only a portion of the page is redrawn.

Another run time benefit to declaratively defining an action flow is that the resulting action flow is agnostic with respect to user interface technologies which may be used by the client device to display the action flow and is thus not tied to a particular technology. This may permit a variety of technologies to be installed on client device 100. For example, the declaratively-defined action flow definition may work with Sencha Ext JS, jQuery, and/or YUI.

Figure 2:
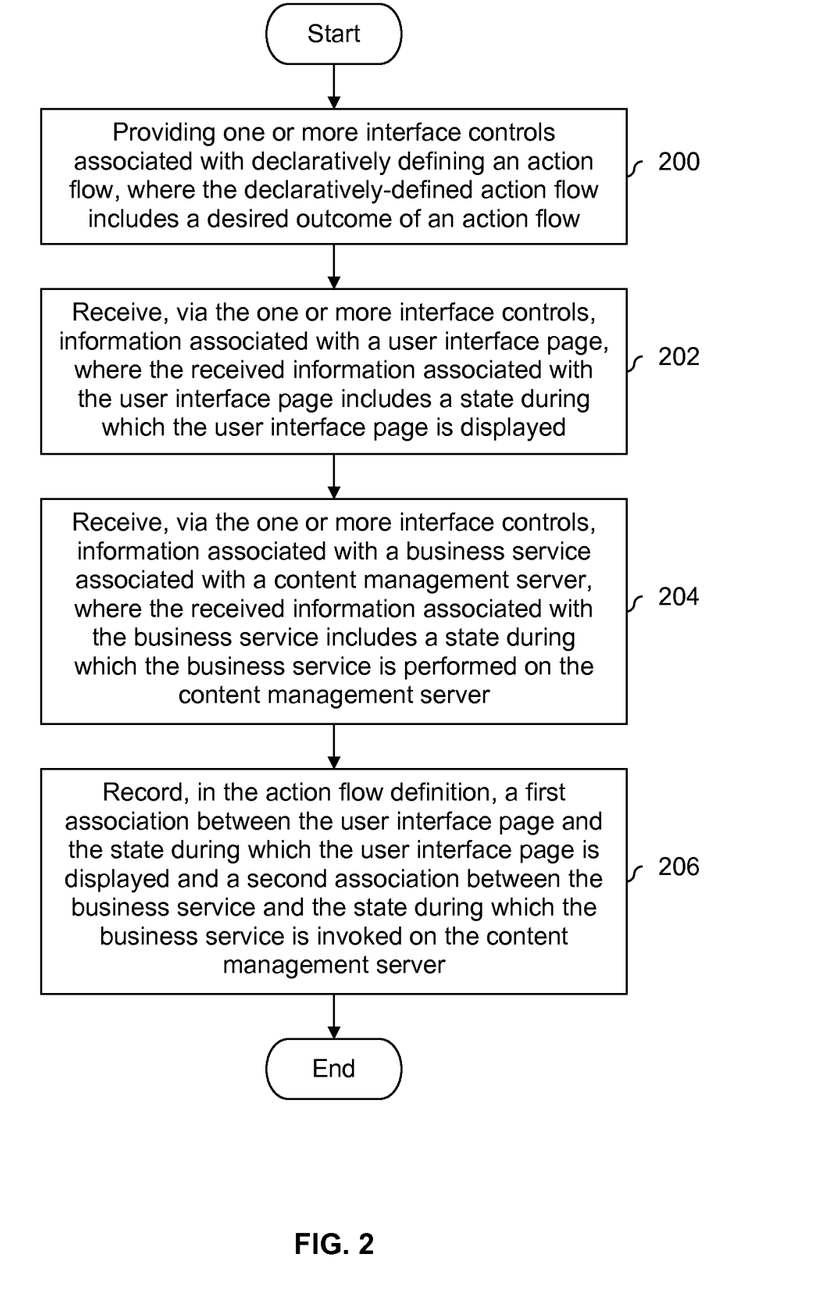
FIG. 2 is a flowchart illustrating an embodiment a process for recording information in an action flow definition.

FIG. 2 is a flowchart illustrating an embodiment a process for recording information in an action flow definition. In some embodiments, front-end server 104 in Figure performs the exemplary process shown. In some embodiments, an action flow definition created using the exemplary process is executed or run at least in part on client device 100 in FIG. 1. In various embodiments, the exemplary technique is used to create a new action flow definition or update an existing action flow definition (e.g., add new states, change a process associated with a given state, etc.).

At 200, one or more interface controls associated with declaratively defining an action flow is/are provided, where the declaratively-defined action flow includes a desired outcome of an action flow. In various embodiments, a variety of interface controls may be provided, including (but not limited to), a drag-and-drop interface, pull-down menus, radio dials or check boxes, etc. In various embodiments, the interface controls are associated with a variety of tasks or actions, such as file management (e.g., saving an action flow definition, opening an action flow definition, closing the application, etc.), assignment of properties or other information to a selected component of an action flow definition (e.g., assigning a name to a selected state, assigning a transition to a selected state, assigning a business service to be invoked during a selected state, etc.), error checking the current state of the action flow definition, or simulating the current state of the action flow definition.

Via the one or more interface controls, information associated with a user interface page is received, where the received information associated with the user interface page includes a state during which the user interface page is displayed at 202. For example, the provided user interface controls may search for user interface pages (e.g., based on file extension or file type, or in a location where files containing user interface pages are expected to be stored) and present the detected user interface pages to a user. The user may select from the presented list a user interface page to associate with the selected state. Alternatively, the user may go navigate through a file system hierarchy to select a desired user interface page.

At 204, via the one or more interface controls, information associated with a business service associated with a content management server is received, where the received information associated with the business service includes a state during which the business service is performed on the content management server. As above, in some embodiments, interface controls may present a list of detected business services, or a user may navigate through a file system hierarchy to select a desired business service to associate with a selected state.

At 206, a first association between the user interface page and the state during which the user interface page is displayed and a second association between the business service and the state during which the business service is invoked on the content management server is recorded in the action flow definition. In some embodiments, the action flow definition is stored on front-end server 104 in FIG. 1, until it is needed by client device 100, at which time is transformed and/or compiled (as or if needed) and then transferred to client device 100.

Figure 3:
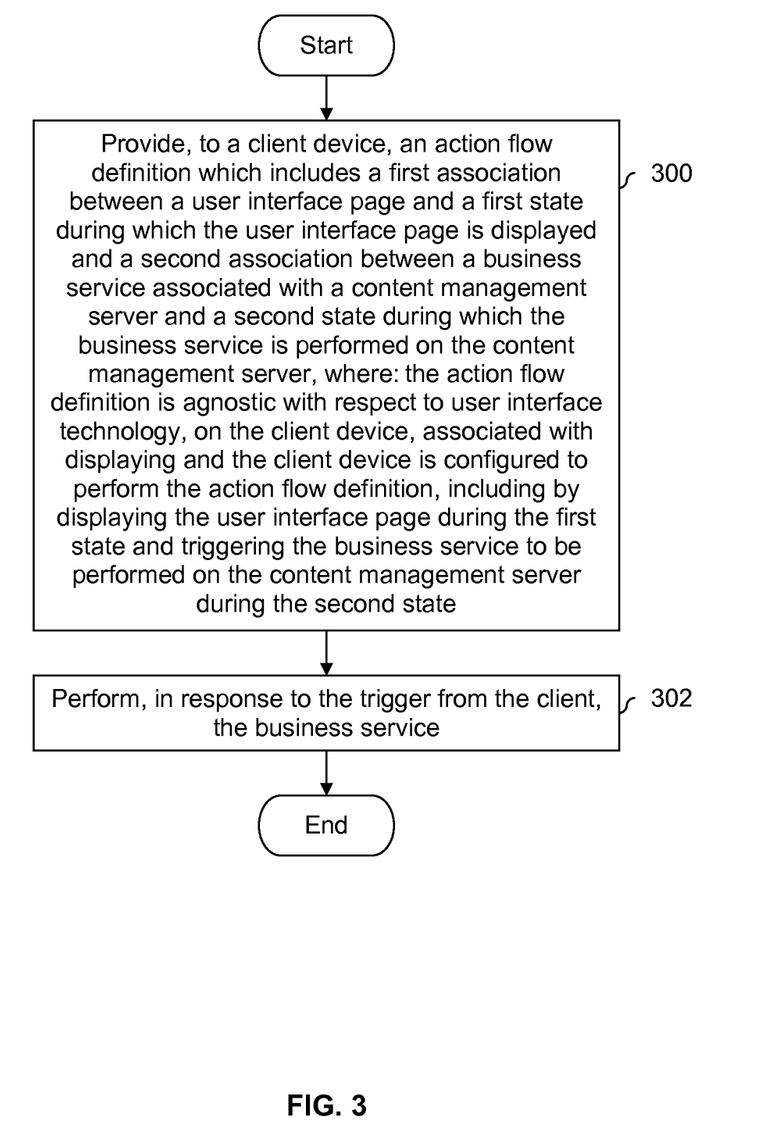
FIG. 3 is a flowchart illustrating an embodiment of a process for providing an action flow definition.

FIG. 3 is a flowchart illustrating an embodiment of a process for providing an action flow definition. In some embodiments, the provided action flow definition is provided by front-end server 104 to client device 100 via network 102 in FIG. 1. In some embodiments, an action flow definition which is provided (e.g., to a client) is not pre-compiled or otherwise pre-processed ahead of time. In some applications this is desirable because the most up-to-date version of the action flow definition is provided each time.

At 300, an action flow definition is provided to a client device where the action flow definition includes a first association between a user interface page and a first state during which the user interface page is displayed and a second association between a business service associated with a content management server and a second state during which the business service is performed on the content management server; the action flow definition is agnostic with respect to user interface technology, on the client device, associated with displaying; the client device is configured to perform the action flow definition, including by displaying the user interface page during the first state and triggering the business service to be performed on the content management server during the second state. In FIG. 1, for example, using a provided action flow definition, client device 100 does not need to consult with front-end server 104 in order to provide or perform the action flow definition (e.g., associated with a web-based a loan application from which loan application content will eventually be sent to content database 106 and/or processed by processes for content 108). Furthermore, the action flow definition is not tied to a particular user interface technology associated with displaying (e.g., Sencha Ext JS, jQuery, and/or YUI) so that client device 100 may employ a variety of technologies and the provided action flow definition is compatible with all of them. In some embodiments, an action flow definition is described in JavaScript Object Notation (JSON). In some embodiments, there is some generation process where a provided copy of an action flow definition is generated from a local copy of an action flow definition on a front-end server. For example, a version of an action flow definition on the front-end server may be transformed, compiled, and so on before being distributed (e.g., to a client device).

At 302, in response to the trigger from the client, the business service is performed. In FIG. 1, for example, client device 100 sends a message or other trigger to content management server 110 to perform a business service which is stored in processes for content 108. In some embodiments, a process stored in 108 is expecting to operate on data stored in content database 106, and data is copied or otherwise moved to content database 106 prior to or as part of the process of executing a business service. In some embodiments, while a business service is being performed (e.g., on a content management server), a user of the action flow (e.g., a loan applicant) does not interact (at least temporarily) with the action flow (e.g., because the applicant has provided all of the requested information for this stage of the application process and has at least temporarily concluded interaction with the action flow).

Figure 4:
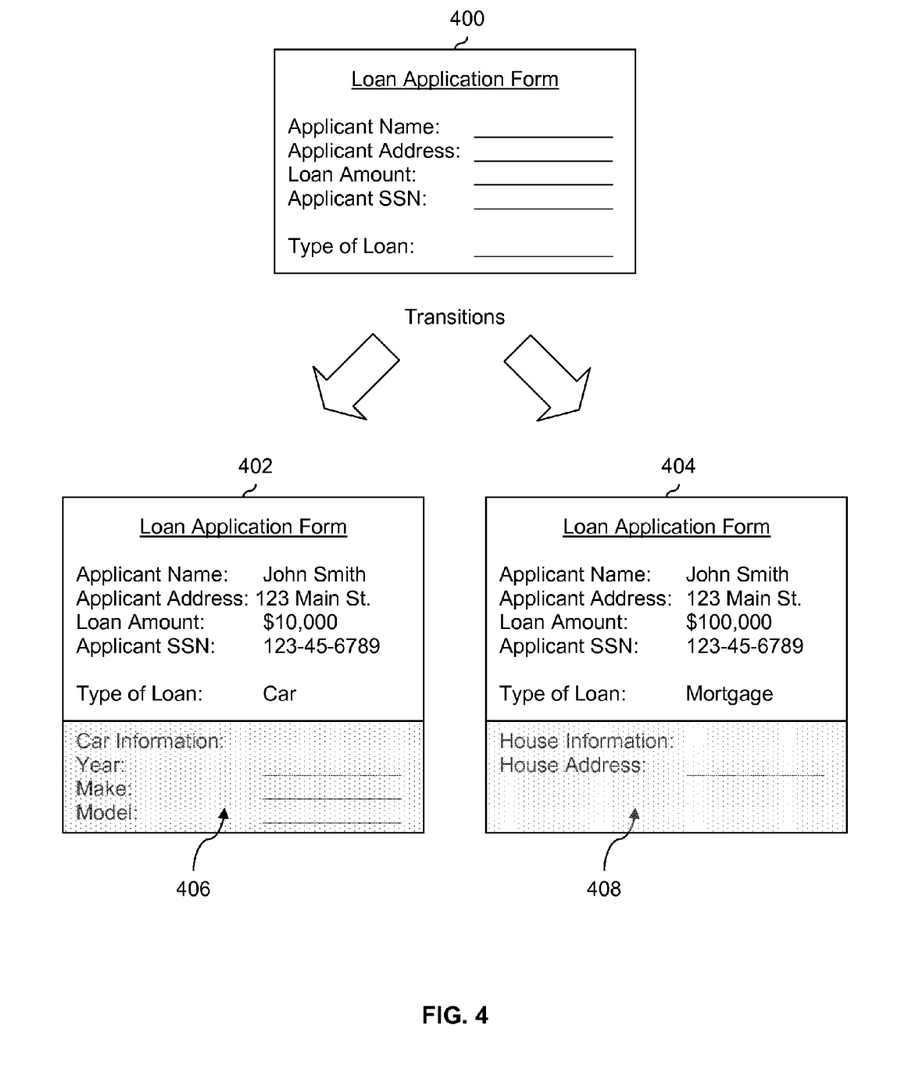
FIG. 4 is a diagram showing an embodiment of three user interface pages associated with a loan application action flow.
Figure 5:
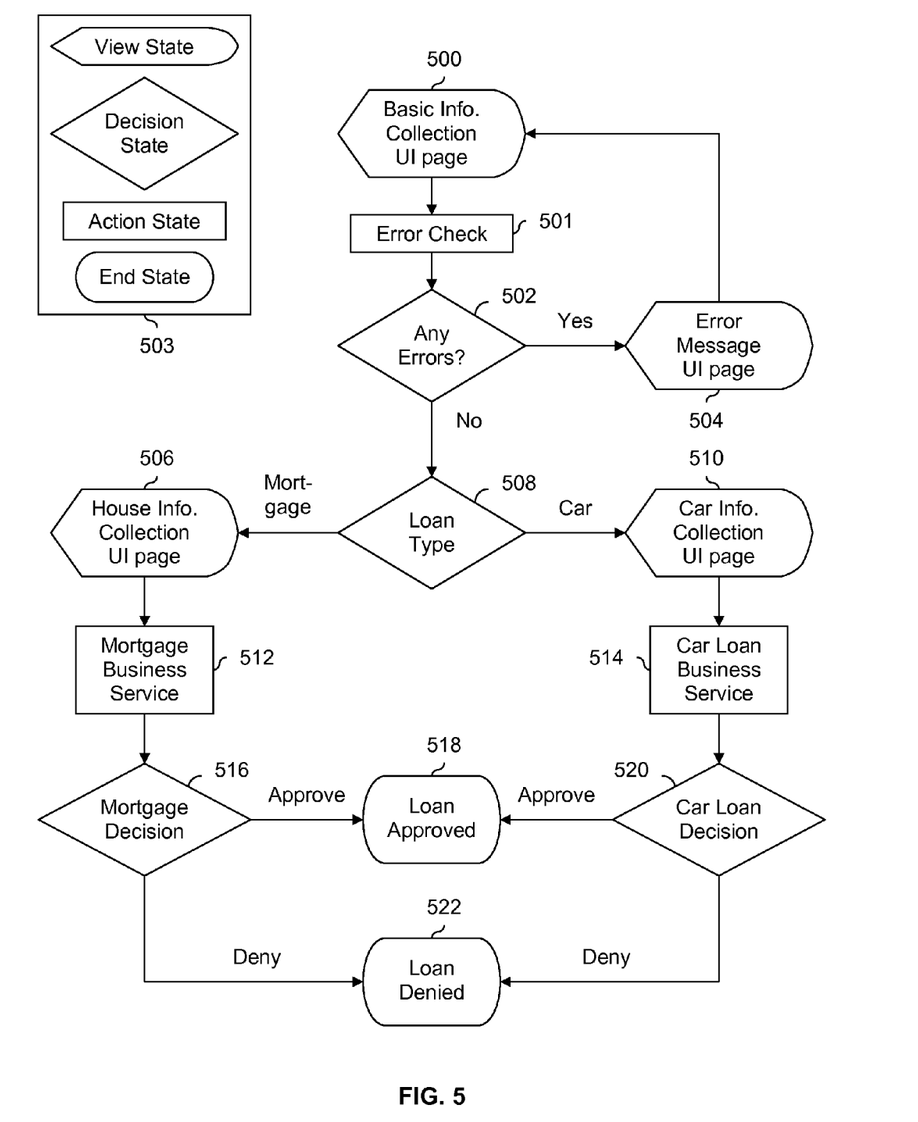
FIG. 5 is a diagram showing an embodiment of an action flow definition.

To more clearly describe the techniques described herein, an exemplary action flow definition is described below in FIGS. 4 and 5. Then, FIGS. 6A and 6B describe an example of how the exemplary action flow in FIGS. 4 and 5 is created or otherwise defined (e.g., when a bank employee creates the exemplary loan application). FIGS. 6B and 6C then describe an example of what happens to the exemplary action flow definition of FIGS. 4 and 5 at run or execution time (e.g., when an applicant is interacting with the exemplary loan application).

FIG. 4 is a diagram showing an embodiment of three user interface pages associated with a loan application action flow. In this example, user interface page 400 collects basic loan information (in this example, applicant name, applicant address, loan amount, applicant social security number (SSN), and type of loan) from a loan applicant; this loan application content may be transferred to and stored in a content management server. Depending upon the type of loan specified in user interface page 400 and if (at least in this example) all of the entered information passes an error check (e.g., performed at the client device), an associated transition and corresponding user interface page result. A first transition from user interface page 400 to user interface page 402 occurs when the type of loan in user interface page 400 is specified to be a car loan and an error check passes. A second transition from user interface page 400 to user interface page 404 occurs when the type of loan in user interface page 400 is specified to be a mortgage and an error check passes.

In addition to the user interface pages shown, there may be additional user interface pages and associated transitions. For example, there may be a user interface page associated with an error message which is displayed if an error checking process (e.g., performed at a client device) detects that the applicant SSN field (as an example) does not have exactly 9 characters and all of those characters are numbers. In various embodiments, various error checks may be performed.

In some embodiments, the transition from user interface page 400 to user interface page 402 or 404 does not necessitate the entire user interface page to be reloaded. For example, rather than re-loading all of user interface page 402 or 404, only car information section 406 or house information section 408 is refreshed. Instead of a viewer seeing a temporarily blank or otherwise empty user interface page (e.g., caused by the entire page refreshing as a result of consulting a server for instructions), the upper portion of user interface pages 402 and 404 may remain the same and only bottom portions 406 and 408 are updated.

FIG. 5 is a diagram showing an embodiment of an action flow definition. The exemplary action flow definition shown here is associated with the user interface pages shown in FIG. 4. Legend 503 shows a variety of exemplary states which are used to define an action flow: a view state, a decision state, an action state, and an end state. A view state is associated with a user interface page, some examples of which are shown in FIG. 2. In some embodiments, a user interface page is composed, such as an xCP step page. A decision state defines a decision or routing within an action flow. An action state is associated with a remote service to be invoked (e.g., on a server) or a local process to be executed locally (i.e., run on a client device itself). As an example of the former, a business service associated with retrieving a credit score for a loan applicant may be stored on a content management server and run on the content management server. As an example of the latter, an error-checking process running on a client device checks to ensure that all required applicant information fields in a user interface page are completed before transitioning to either a car loan user interface page or a mortgage user interface page. An end state defines an end or closure of the action flow; in some embodiments, there is more than one end state. In some embodiments, an event, process, or service is triggered or otherwise initiated at or by an end state. In various embodiments, various other states may be used.

The exemplary action flow begins at view state 500, basic information collection user interface. In this view state, user interface page 400 in FIG. 4 is displayed, for example to a loan applicant in response to a request to begin a loan application. In some embodiments, a beginning state is marked or flagged to indicate that it is the beginning of the action flow. In action state 501, an error check is performed. In this example, the error check performs error checking on the information entered into user interface page 400 by a loan applicant. The error check, for example, checks to ensure that all required fields have a entry, that the social security number entered has the correct number of characters and all of those characters are numbers (as opposed to special characters or letters), and so on. In some embodiments, an error check associated with action state 501 is run on a client device (e.g., as opposed to having the error checking done by or on a server). In some embodiments, action state 501 is triggered or otherwise entered based on a user interaction with the action flow (e.g., by pressing an "Enter" button (not shown) on user interface page 400 in FIG. 4).

At decision state 502, if there are any errors then the action flow goes to view state 504, error message user interface page, and then returns to view state 500 (i.e., basic information collection user interface page). If there are no errors at decision state 502 then the action flow goes to decision state 508, loan type. If the loan type specified in the loan type field is a mortgage, then the action flow goes to view state 506, house information collection user interface page. In view state 506, user interface page 204 in FIG. 2 is displayed.

Action state 512 (i.e., mortgage business service) comes after view state 506 (i.e., house information collection user interface page). In some embodiments, action state 512 is entered or triggered based on a user interaction with the action flow, for example by pressing an "Enter" button in user interface page 404 in FIG. 4 after providing information about a house for which a mortgage is desired. In some embodiments, an applicant's interaction with the exemplary loan application ends at least temporarily after view state 506. An applicant may, for example, wait for the bank to gather more information and await a decision on the loan application. In various embodiments, a mortgage business service includes a variety of (e.g., back-end) processes or actions related to a mortgage application. Some examples include retrieving a credit history or a credit score from a third-party (e.g., a credit rating agency such as FICO, TransUnion, etc.), confirming that an applicant actually has the down payment required or income specified in a loan application, initiating a home inspection and home appraisal, sending a notification to a loan officer if one or more events are approaching a deadline or have exceeded a deadline, and/or sending a notification to a loan officer that all required actions have been completed.

In some embodiments, a business service (such as the mortgage business service associated with action state 512) is stored on and run on a content management server and results (if any) are returned from the content management server to a client device via a front-end server. For example, for security reasons a company may wish to retain control of business services and not download processes or executables onto an unknown device, which may potentially result in the exposure of sensitive business practices and/or proprietary information to a malicious entity. In some embodiments, this is because a client device may be turned off at times (e.g., while an applicant waits for a decision from a bank) and it may be desirable to execute a business service on a device which will not be turned off unexpectedly.

Decision state 516 (i.e., mortgage decision) occurs after action state 512 (i.e., mortgage business decision). If the mortgage application is approved, the action flow goes to end state 518, loan approved. In some embodiments, an end state triggers a business service, such as a notifying the applicant or a bank officer that the loan has been approved and/or tagging related content in a content management server so that processes running on the content management server can properly manage that information. For example, the contents of the loan application are flagged as "approved" and/or migrated to storage associated with approved applications so that retention policies appropriate for approved loan application are applied to the loan application content as opposed to retention policies associated with pending or denied application (e.g., pending applications are deleted if they languish for 90 days and denied applications are deleted at the end of the month whereas approved applications are kept for the duration of the loan, plus 3 years after payoff). Similarly, end state 522 (i.e., loan denied) may trigger or otherwise be associated with a variety of business services or other processes. In some embodiments, at least some processes associated with states 516-522 are performed on a server (e.g., because a client device is not necessarily guaranteed to be on at this time).

If the loan type specified in the loan type field is a car loan, then the action flow goes from decision state 508 to view state 510 (i.e., car information collection user interface page). In this state, user interface page 402 in FIG. 4 is displayed. Similar to the mortgage branch of the action flow, action state 514 (i.e., car loan business service) follows view state 510 (i.e., car information collection user interface page). As above, action state 514 may be triggered or entered as a result of a variety of conditions or events. In various embodiments, a car loan business service is stored on and run on a content management server (e.g., 110 in FIG. 1) and/or includes a variety of (e.g., back-end) processes and tasks related to a car loan, such as obtaining a credit score or other type of credit information for an applicant, pricing the car through a variety of channels or sources (e.g., Kelley blue book for used cars or an invoice price between a dealer and a manufacturer for new cars), and verifying proof of automobile insurance and/or a driver's license, notifying a loan officer, notifying a car salesperson, and so on.

Decision state 520 follows action state 514. If the car loan decision at 520 is to approve the loan, then the action flow goes to end state 518 (i.e., loan approved). If the car loan decision at 520 is to deny the loan, then the action flow goes to end state 522 (i.e., loan denied). In various embodiments, various business services or other actions are triggered or initiated by end states 518 or 522. In some embodiments, car loans and mortgages have different end states.

An action file definition may include record associations, connections, and other information so that when the action file definition is accessed and performed, the action flow is able to be properly provided or otherwise performed by the executing entity (e.g., a client device). For example, an action flow definition may record that user interface page 400 in FIG. 4 is associated with view state 500 (e.g., so that it is known to present that user interface page during view state 500), an action flow definition may record that action state 501 follows view state 500, an action file definition may record an association between action state 512 and an associated mortgage business service on a content management server (e.g., so that it is known to invoke the mortgage business service during action state 512), and so on.

The following figures describe creation of an action flow description associated with the exemplary loan application (for example by a bank employee), as well as how the action flow definition is interpreted or otherwise executed at run time or execution time.

Figure 6A:
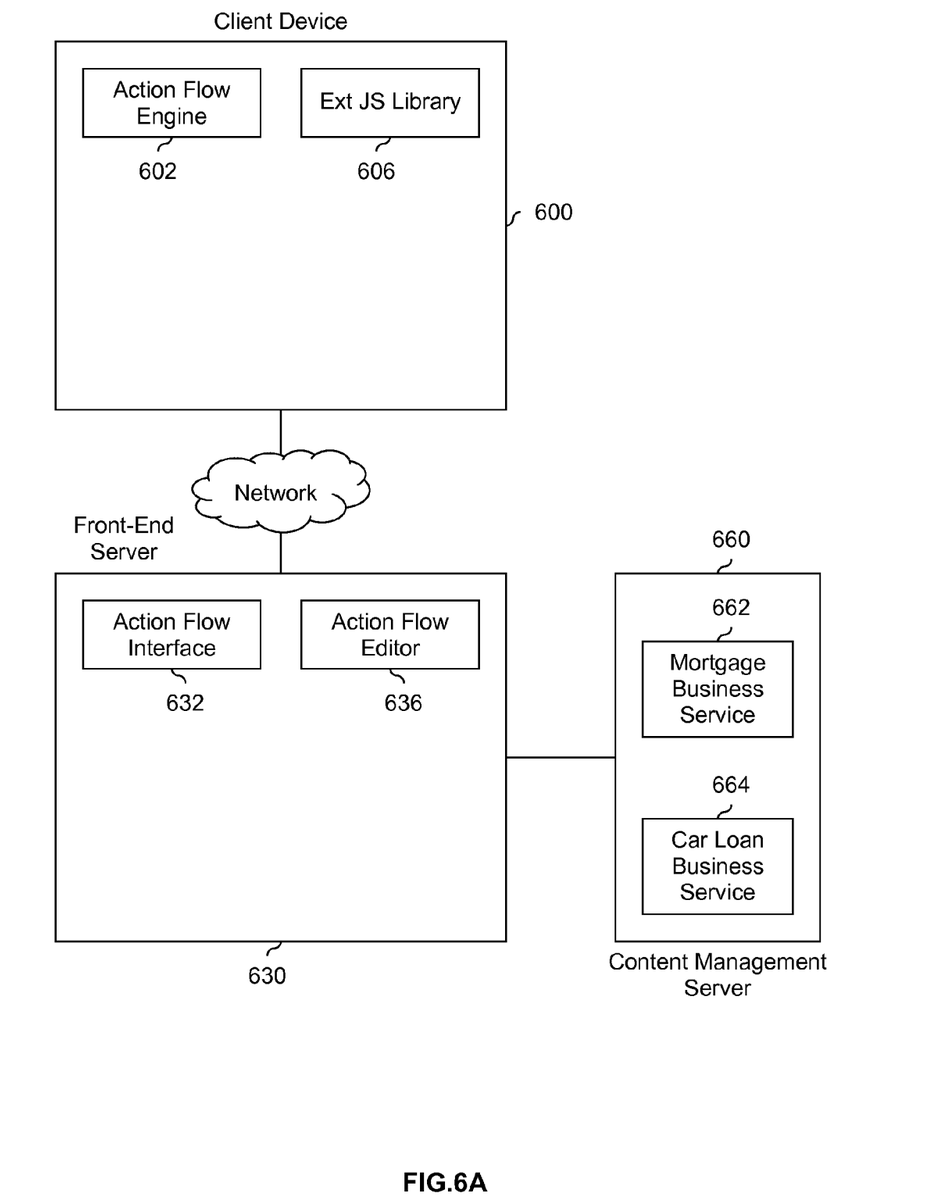
FIG. 6A is a diagram showing an embodiment of a system prior to creation of an action flow definition associated with a loan application.
Figure 6B:
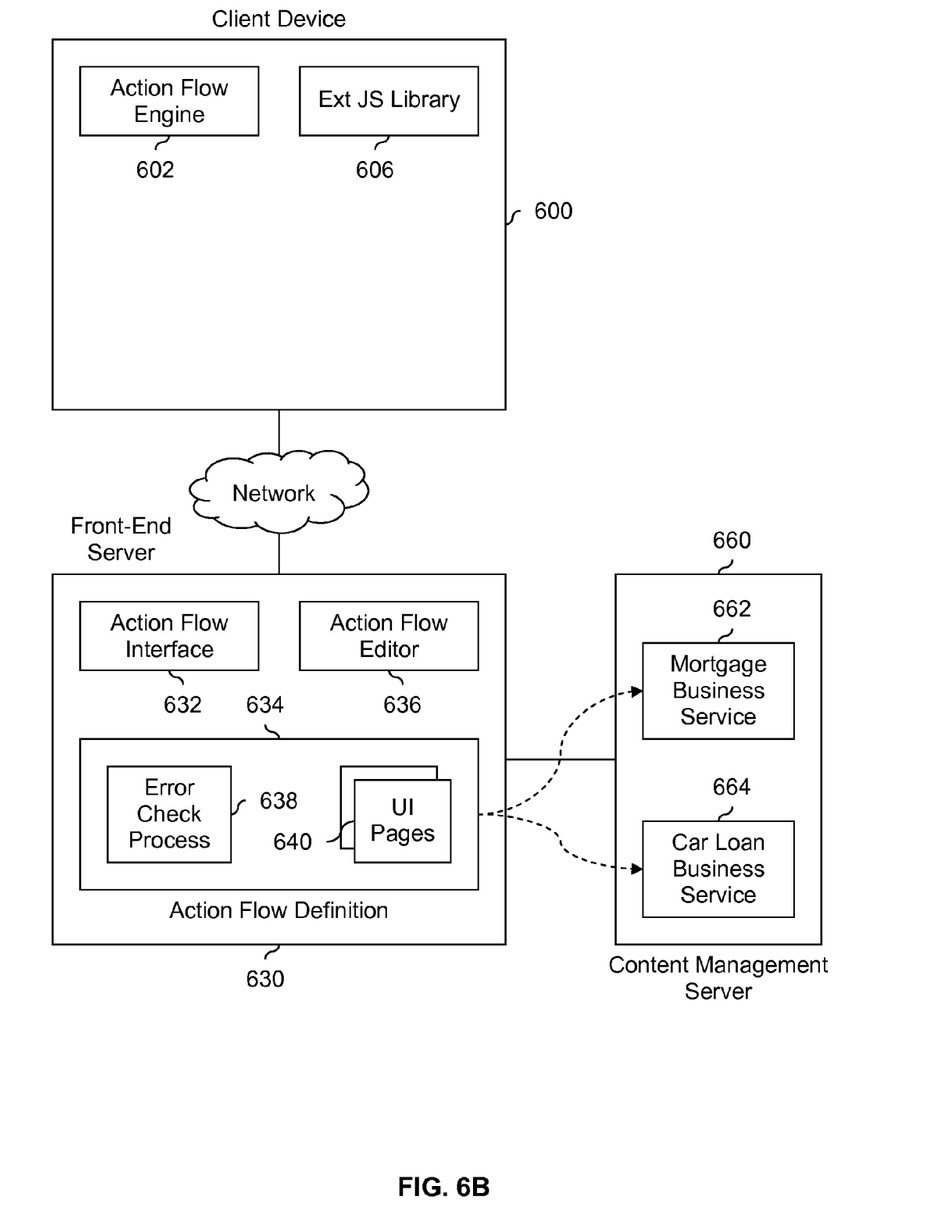
FIG. 6B is a diagram showing an embodiment of a system after creation of an action flow definition associated with a loan application.
Figure 6C:
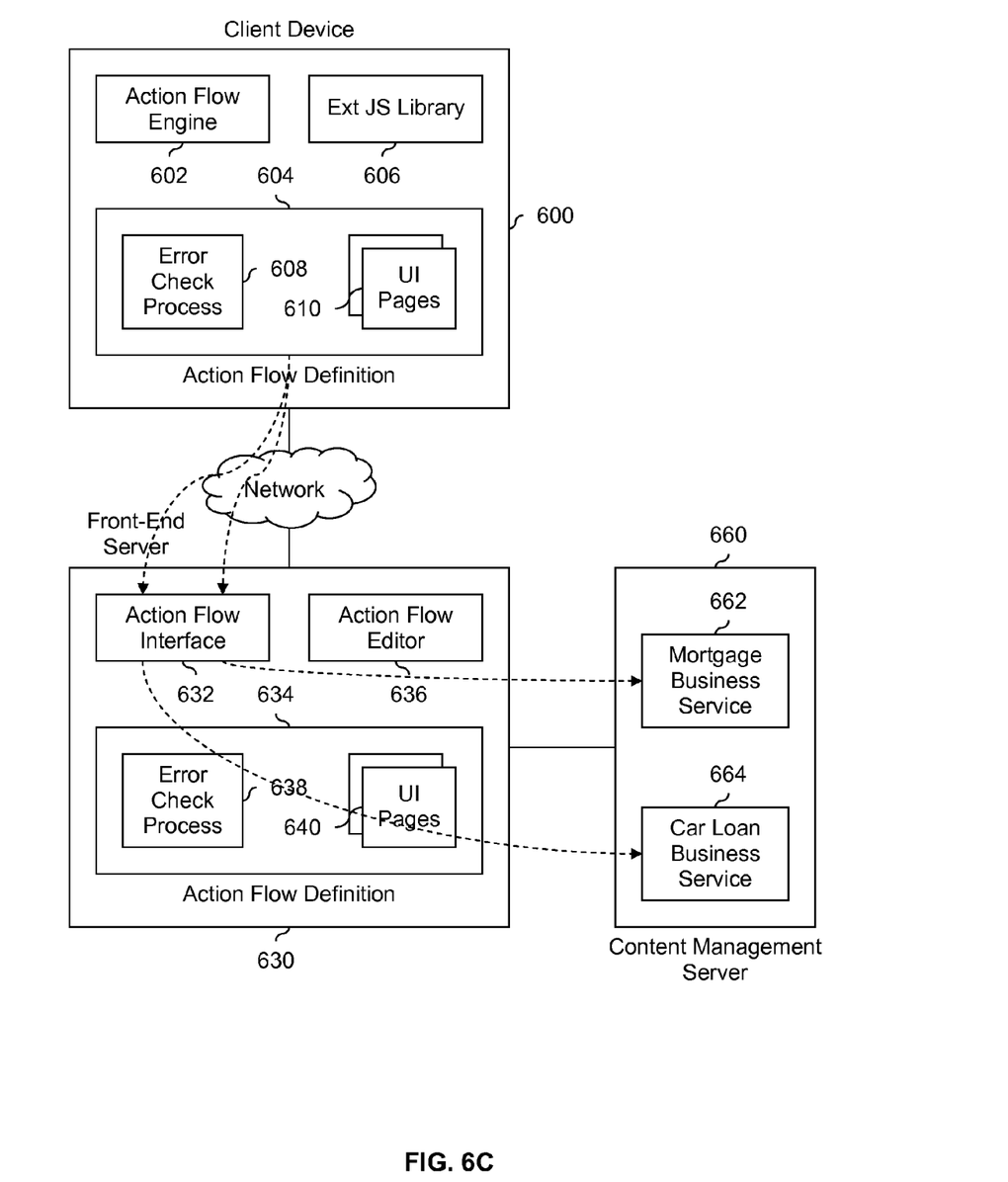
FIG. 6C is a diagram showing an embodiment of a system at run time of an action flow associated with a loan application.

FIG. 6A is a diagram showing an embodiment of a system prior to creation of an action flow definition associated with a loan application. In the example shown, content management server 660 includes mortgage business service 662 and car loan business service 664. In some embodiments, business services 662 and 664 are stored in processes for content 108 in FIG. 1. In this particular example, business services 662 and 664 already exist prior to creation of an action flow definition which references those business services. For example, a bank may have been using a content management application internally for some time and it is now decided to expand the platform in order to more seamlessly integrate creation and importation of loan application content into the flow (e.g., as opposed to other techniques for entering or creating loan application content, such as manually entering the information in, or using a stand-alone script on a different platform to import in loan application content). Alternatively, in some embodiments, a business service may be created or otherwise defined contemporaneously when an associated action flow is created or defined.

Front-end server 630 includes action flow interface 632 and action flow editor 636. A bank employee or other user tasked with creating an action flow definition for a loan application uses action flow editor 636 to create or otherwise define the action flow definition. One example of an action flow editor is EMC Documentum xCP Designer, which is an Eclipse based application designer to the EMC Documentum content management application.

An action flow editor provides a way for the exemplary bank employee to create an action flow definition in a declarative manner. In some embodiments, action flow editor 636 is a stand-alone tool runs on a desktop machine. At least some embodiments of the tool update the action flow definitions on front end server 630. Consequently, a user of action flow editor is able to create an action flow definition without (for example) knowing how to code in a particular language or technology. This enables an expert with knowledge of a company's unique set of rules for how things are done at that company and/or with intimate knowledge of regulatory requirements to create the action flow definition directly. Furthermore, a declaratively-defined action flow is not tied to a particular technology and therefore can be executed on many types of devices and/or execution platforms. An example of a graphical user interface associated with an action flow editor is described in further detail below.

FIG. 6B is a diagram showing an embodiment of a system after creation of an action flow definition associated with a loan application. In the example shown, FIGS. 6A and 6B show the same system but FIG. 6B is at a later point in time. Action flow definition 634 has been created using action flow editor 636 and is stored on front-end server 650. In this particular example, action flow definition 634 includes error check process 638 (e.g., associated with action state 501 in FIG. 3) and user interface pages 640 (e.g., associated with one or more of view states 500, 504, 506, and/or 510). Action flow definition 634 further includes references to mortgage business service 662 and car loan business service 664 on content management server 660, including which action states within the action flow definition those business services are associated with (i.e., recording that mortgage business service 662 is associated with action state 512 in FIG. 5 and that car loan business service 664 is associated with action state 514 in FIG. 5).

In some embodiments, using action flow editor 636, a user is able to later update or otherwise modify action flow definition 634 stored on front-end server 630. For example, a bank employee (after initially creating a loan application) may be asked to modify the action flow definition in order to comply with some new lending laws.

FIG. 6C is a diagram showing an embodiment of a system at run time of an action flow associated with a loan application. In the example shown, FIGS. 6B and 6C show the same system but FIG. 6C is at a later point in time. In some embodiments, the state of the system shown is triggered by the actions of a user at client device 600, for example by clicking on a link or other user interface control associated with starting a loan application via the loan application action flow.

In this example, action flow definition 634 on front-end server 630 is transformed if or as needed by action flow interface 632 and moved to client device 600 using action flow interface 632 and action flow engine 602, resulting in action flow definition 604.

Once on client device 600, action flow engine 602 interprets and executes action flow definition 604, for example in response to the current state and/or user input (e.g., inputs from a loan applicant via a mouse, keyboard, etc.). Ext JavaScript (JS) library 606 is used by action flow engine 602 to display or otherwise present the action flow to a user (e.g., a loan applicant). In various embodiments, Ext JS library 606 includes application programming interfaces (APIs), JavaScript classes, and so on. In some embodiments, some other type of library is used. With Ext JS library 606 and action flow definition 604, action flow engine 602 is able to properly execute or otherwise provide the action flow to a user.

In this particular example, if a business service is invoked, the business service in question is executed on content management server 660 via or otherwise using action flow interface 632. This configuration may be desirable since then action flow engine 602 on client device 600 is not required to know how to communicate with content management server 660 and/or the only communication channel that content management server 660 exposes to client device 600 is via action flow interface 630. Results, if any, from the invoked business service are returned in this example via action flow interface 632 to action flow engine 602. In some embodiments, business service 662 and/or business service 664 expect to operate on information located in content management server 660 (e.g., in content database 106 in FIG. 1), and prior to a business service being invoked, appropriate content is copied to content management server 660 as needed.

In some embodiments, action flow definition 604 on client device 600 is different from action flow definition 634 on front-end server 630. For example, there may be some library on front-end server 630 which is not available on client device 600 and prior to sending the action flow definition to the client device, whatever information in the library is included in the transferred action flow definition so that client device 600 is able to properly execute the action flow definition. In some embodiments, a transformation is performed on an action flow definition 634 to generate action flow definition 604.

In some embodiments, any transformation, assembly, resolution, or compilation of an action flow definition during transfer from front-end server 630 to client device 600 does not occur until the action flow definition is desired or otherwise needed at client device 600. As a result, in such embodiments, changes to the action flow definition may occur until relatively late and the most up-to-date version of the action flow definition is provided to and run on client device 600. In some embodiments, an action flow definition is permitted to be cached at a client device so that it may be used for more than one session. In some embodiments, there is a lifetime specified for an action flow definition cached at a client device to mitigate stale or out-of-date action flow definitions.

In some embodiments, any transformation performed on action flow definition 630 in order to obtain action flow definition 604 is performed in a manner such that the result (e.g., action flow definition 604) is platform or technology agnostic. That is, the resulting action flow definition which is provided to a client device may be run on a variety of technologies or platforms in at least some embodiments. For example, action flow engine 602 may be a JavaScript based engine for interpreting and executing action flow definition 604, and action flow definition 604 is described in a JavaScript-related technology (such as JavaScript Object Notation (JSON)) and since JavaScript is platform/device independent, action flow definition 604 is capable of running or executing on a variety of web browsers on any platforms.

Figure 7:
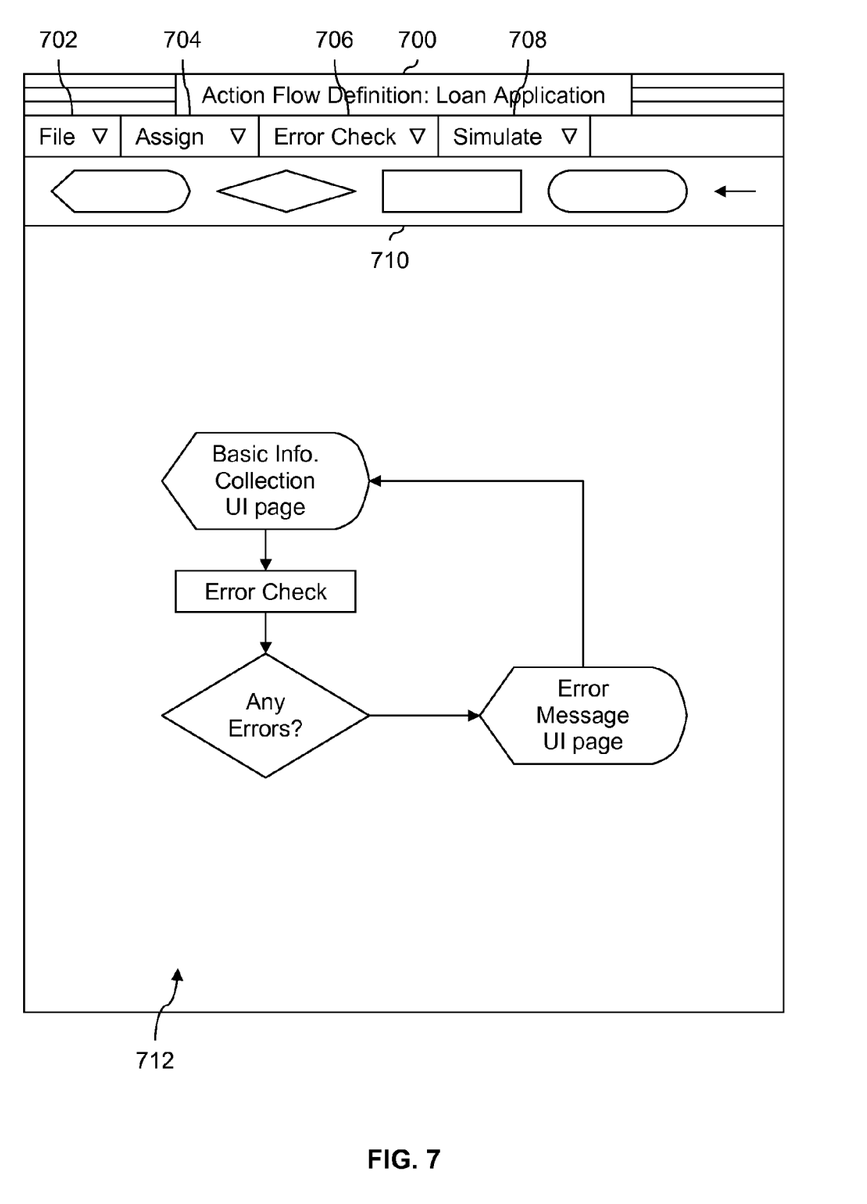
FIG. 7 is a diagram showing an embodiment of a graphical user interface for creating and/or updating an action flow definition.

FIG. 7 is a diagram showing an embodiment of a graphical user interface for creating and/or updating an action flow definition. In some embodiments, the graphical user interface shown in this figure is an example of an action flow editor (e.g., action flow editor 636 in FIGS. 6A-6C). A variety of input/output devices may be used to build an action flow definition and include a keyboard, a stylus, a mouse, etc.

Graphical user interface 700 includes a number of pull down menus and icons which may be dragged and dropped. File pull down 702 may include operations associated with file management, including (but not limited to) opening a saved action flow definition, saving an action flow definition (including specification of the action flow name if new), exiting the graphical user interface, etc.

Assign pull down 704 is used to assign properties associated with a selected component in an action flow definition. For example, to assign a business service to be invoked with a particular action state, the action state may be selected using any appropriate technique (e.g., drawing a box around it, left-clicking with a mouse, using a tab key on a keyboard, etc.) and then using assign pull down 704, a desired business service (e.g., which would, when executed, run remotely on some server) or a desired local process (e.g., which would, when executed, be run locally on a client device) is selected. Assign pull down 704 may be used for other assignment related tasks, such as specifying the conditions or branches associated with a particular decision state, specifying which user interface page is associated with a given view state, etc. Other assignment techniques in addition to or as an alternative to pull down menu 704 may be used. For example, a desired state may be selected in space 712 and a right mouse click may bring up a menu via which an assignment is made for the selected state.

Error check pull down 706 is associated with performing error checking on the current state of the action flow definition. For example, there may be a rule that at least one end state must be included in the action flow definition, a rule may check for dangling or unconnected states, a rule may check for a state which has not been assigned a required element (e.g., an action state which has no service or process assigned to it, a view state which has no user interface page assigned to it, etc.), and so on. In some embodiments, an error check produces a written list of errors. In some embodiments, errors are flagged graphically in space 712. For example, colors (such as red) and/or visual effects (such as blinking) may be used to highlights those parts of the action flow definition which contain errors.

Simulate pull down 708 in some embodiments brings up another window which shows what a user of the action flow (e.g., a loan applicant) would see given the current state of the action flow definition. In some embodiment, a simulated action flow is interactive, so that an action flow developer or tester is able to (as for example) enter in test values, click on links, and so on in order to see what a user would experience (e.g., what user interface pages would be presented, what progression of states occur, what processes or services would be run in a particular state, etc.). In some embodiments, a simulated action flow is modified slightly from e production version of an action flow. For example, for debugging purposes, information associated with the current state that the simulation is in (e.g., the name of the current state, the name of a business service associated with the current state, a data value associated with the current state, or the name of a user interface page associated with the current state) may be displayed to aid an action flow developer or tester. In some embodiments, prior to performing a simulation, error checking (e.g., the same error check which would be triggered by pull down 706) is performed prior to a simulation. In some embodiments, error checking is not performed prior to simulation, and if the action flow definition as it currently stands is unable to be resolved, it is so indicated to the user of graphical user interface 700.

Drag-and-drop icons 710 are used to create new states and new connections between those states. In this particular example, there are 4 different types of states (each corresponding to different shape), and an arrow is used to show the connections or progressions between states. This is merely one example of a graphical user interfaces; a variety of interfaces may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for recording information in an action flow definition, comprising:
    an interface configured to:
        provide one or more interface controls associated with declaratively defining an action flow, wherein the declaratively-defined action flow includes a desired outcome of an action flow;
        receive, via the one or more interface controls, information associated with a user interface page, wherein the received information associated with the user interface page includes a state during which the user interface page is displayed; and
        receive, via the one or more interface controls, information associated with a business service associated with a content management server, wherein the received information associated with the business service includes a state during which the business service is performed on the content management server; and
    a processor configured to record, in the action flow definition, a first association between the user interface page and the state during which the user interface page is displayed and a second association between the business service and the state during which the business service is invoked on the content management server, wherein:
        a client device is configured to receive the action flow definition from a front-end server; and
        the client device is configured to perform the action flow definition, including by: (1) displaying the user interface page during the first state based on the action flow definition provided to the client device by the front-end server and (2) triggering the business service to be performed on the content management server during the second state based on the action flow definition provided to the client device by the front-end server.

2. The system recited in claim 1, wherein the one or more interface controls include a first interface control having a first shape which is associated with a first type of state and a second interface control having a second shape which is associated with a second type of state.

3. The system recited in claim 2, wherein the first type of state includes at least one of the following: a view state, an action state, a decision state, or an end state.

4. The system recited in claim 1, wherein the one or more interface controls include an interface control associated with assigning information to a selected state, wherein the assigned information is permitted to be one or more of the following: a user interface page, a business service associated with a content management server, a process associated with a client device, a transition, a decision, a condition, or a name of the selected state.

5. The system recited in claim 1, wherein:
    the one or more interface controls include an interface control associated with performing an error check on the action flow definition;
    the processor is further configured to perform the error check on the action flow definition; and
    the interface is further configured to present information associated with an error detected as a result of performing the error check on the action flow definition.

6. The system recited in claim 1, wherein:
    the one or more interface controls include an interface control associated with simulating an action flow using the action flow definition;
    the processor is further configured to simulate the action flow definition; and
    the interface is further configured to present information resulting from the simulation of the action flow definition.

7. The system recited in claim 6, wherein the information resulting from the simulation of the action flow definition includes one or more of the following: a name of a current state, a name of a business service associated with the current state, a data value associated with the current state, or a name of a user interface page associated with the current state.

8. A computer program product for recording information in an action flow definition, the computer program product being embodied in a non-transitory computer readable storage medium and comprising computer instructions stored in memory executed by a hardware processor for:
    providing one or more interface controls associated with declaratively defining an action flow, wherein the declaratively-defined action flow includes a desired outcome of an action flow;
    receiving, via the one or more interface controls, information associated with a user interface page, wherein the received information associated with the user interface page includes a state during which the user interface page is displayed;

receiving, via the one or more interface controls, information associated with a business service associated with a content management server, wherein the received information associated with the business service includes a state during which the business service is performed on the content management server; and recording, in the action flow definition, a first association between the user interface page and the state during which the user interface page is displayed and a second association between the business service and the state during which the business service is invoked on the content management server, wherein:

a client device is configured to receive the action flow definition from a front-end server; and the client device is configured to perform the action flow definition, including by: (1) displaying the user interface page during the first state based on the action flow definition provided to the client device by the front-end server and (2) triggering the business service to be performed on the content management server during the second state based on the action flow definition provided to the client device by the front-end server.

9. The computer program product recited in claim 8, wherein the one or more interface controls include a first interface control having a first shape which is associated with a first type of state and a second interface control having a second shape which is associated with a second type of state.

10. The computer program product recited in claim 9, wherein the first type of state includes at least one of the following: a view state, an action state, a decision state, or an end state.

11. The computer program product recited in claim 8, wherein the one or more interface controls include an interface control associated with assigning information to a selected state, wherein the assigned information is permitted to be one or more of the following: a user interface page, a business service associated with a content management server, a process associated with a client device, a transition, a decision, a condition, or a name of the selected state.

12. The computer program product recited in claim 8, wherein:

the one or more interface controls include an interface control associated with performing an error check on the action flow definition; and the computer program product further comprises computer instructions for:

performing the error check on the action flow definition; and presenting information associated with an error detected as a result of performing the error check on the action flow definition.

13. The computer program product recited in claim 8, wherein:

the one or more interface controls include an interface control associated with simulating an action flow using the action flow definition; and the computer program product further comprises computer instructions for:

simulating the action flow definition; and presenting information resulting from the simulation of the action flow definition.

14. The computer program product recited in claim 13, wherein the information resulting from the simulation of the action flow definition includes one or more of the following:

a name of a current state, a name of a business service associated with the current state, a data value associated with the current state, or a name of a user interface page associated with the current state.

15. A system for providing an action flow definition, comprising:

a front-end server configured to provide, to a client device, an action flow definition which includes a first association between a user interface page and a first state during which the user interface page is displayed and a second association between a business service associated with a content management server and a second state during which the business service is performed on the content management server, wherein:

the action flow definition is agnostic with respect to user interface technology, on the client device, associated with displaying; and the client device is configured to perform the action flow definition, including by: (1) displaying the user interface page during the first state based on the action flow definition provided to the client device by the front-end server and (2) triggering the business service to be performed on the content management server during the second state based on the action flow definition provided to the client device by the front-end server; and a content management server which is configured to perform, in response to the trigger from the client, the business service.

16. The system recited in claim 15, wherein the action flow definition includes JavaScript Object Notation (JSON).

17. The system recited in claim 15, wherein:

the action flow definition provided from the front-end server to the client device is a first action flow definition; and the front-end server is further configured to generate the first action flow definition based at least in part on a second action flow definition which is stored on the front-end server.

18. The system recited in claim 17, wherein the front-end server is configured to generate the first action flow definition is triggered by a request from the client device.

19. A computer program product for providing an action flow definition, the computer program product being embodied in a non-transitory computer readable storage medium and comprising computer instructions stored in memory executed by a hardware processor for:

providing, to a client device, an action flow definition which includes a first association between a user interface page and a first state during which the user interface page is displayed and a second association between a business service associated with a content management server and a second state during which the business service is performed on the content management server, wherein:

the action flow definition is agnostic with respect to user interface technology, on the client device, associated with displaying; and the client device is configured to perform the action flow definition, including by (1) displaying the user interface page during the first state based on the action flow definition provided to the client device by the front-end server and (2) triggering the business service to be performed on the content management server during the second state based on the action flow definition provided to the client device by the front-end server;

and performing, in response to the trigger from the client, the business service on the content management server.

20. The computer program product recited in claim 19, wherein the action flow definition includes JavaScript Object Notation (JSON).

21. The computer program product recited in claim 19, wherein:
- the action flow definition provided from the front-end server to the client device is a first action flow definition; and
- the computer program product further includes computer instructions for generating the first action flow definition based at least in part on a second action flow definition which is stored on the front-end server.

22. The computer program product recited in claim 21, wherein the computer instructions for generating the first action flow definition are triggered by a request from the client device.

23. A method for recording information in an action flow definition, including:
- providing one or more interface controls associated with declaratively defining an action flow, wherein the declaratively-defined action flow includes a desired outcome of an action flow;
- receiving, via the one or more interface controls, information associated with a user interface page, wherein the received information associated with the user interface page includes a state during which the user interface page is displayed;
- receiving, via the one or more interface controls, information associated with a business service associated with a content management server, wherein the received information associated with the business service includes a state during which the business service is performed on the content management server; and
- recording, in the action flow definition, a first association between the user interface page and the state during which the user interface page is displayed and a second association between the business service and the state during which the business service is invoked on the content management server, wherein:
  - a client device is configured to receive the action flow definition from a front-end server; and
  - the client device is configured to perform the action flow definition, including by: (1) displaying the user interface page during the first state based on the action flow definition provided to the client device by the front-end server and (2) triggering the business service to be performed on the content management server during the second state based on the action flow definition provided to the client device by the front-end server.

24. A method for providing an action flow definition, including:
- providing, to a client device, an action flow definition which includes a first association between a user interface page and a first state during which the user interface page is displayed and a second association between a business service associated with a content management server and a second state during which the business service is performed on the content management server, wherein:
  - the action flow definition is agnostic with respect to user interface technology, on the client device, associated with displaying; and
  - the client device is configured to perform the action flow definition, including by (1) displaying the user interface page during the first state based on the action flow definition provided to the client device by the front-end server and (2) triggering the business service to be performed on the content management server during the second state based on the action flow definition provided to the client device by the front-end server; and
- performing, in response to the trigger from the client, the business service on the content management server.

* * * * *